United States Patent Office 3,438,385
Patented Apr. 15, 1969

3,438,385
FLOW BLENDING CONTROL SYSTEM
Iwao Nogami, Tokyo, Japan, assignor to Honeywell Inc., Minneapolis, Minn., a corporation of Delaware
Filed Jan. 19, 1966, Ser. No. 521,597
Claims priority, application Japan, Jan. 21, 1965, 40/2,800
Int. Cl. G05d 11/13; G05b 11/38
U.S. Cl. 137—101.19        2 Claims

ABSTRACT OF THE DISCLOSURE

A flow rate signal for one of the components to be blended is applied to a signal generator which is adjusted to the desired value for the ratio of the flow rates of this component and the blend. The output of the generator is a signal representing the flow rate of the total blend, and this signal is multiplied by the desired ratio of the flow rates of a second component and the blend to form a signal representing the required flow rate of the second component. The latter signal and a flow rate signal for the second component are applied to a reversible counter which controls the flow rate of the second component to maintain the last mentioned two signals equal.

---

The present invention relates to an improvement of the flow blending control system known as the digital blending control system which controls the flow on the basis of accumulated values.

Figure 1:
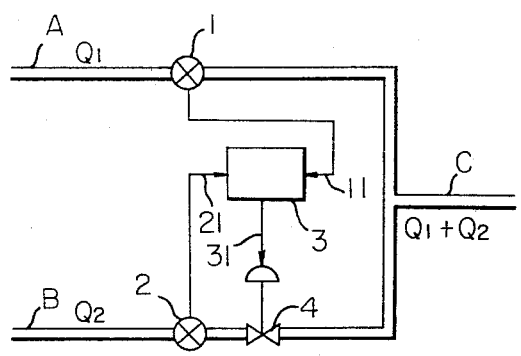
Figure 2:
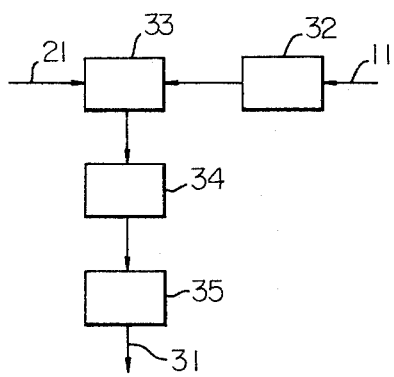
Figure 3:
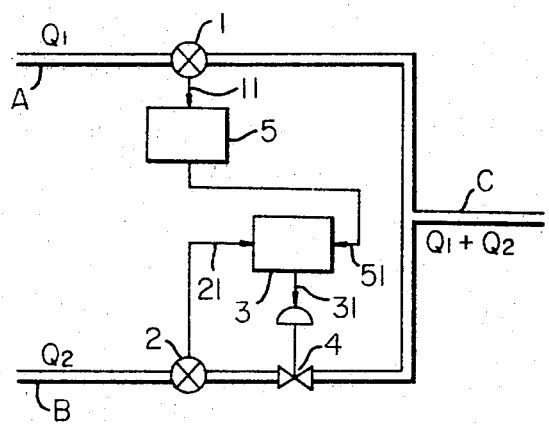
Figure 4:
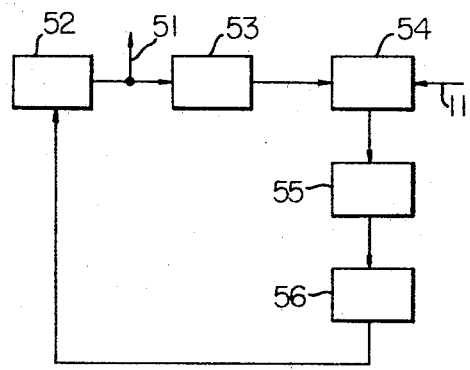

The aim and nature of the present invention will be described in conjunction with the attached drawings, in which:

FIG. 1 is a conventional blending control system applied to a system for blending two components, FIG. 2 is a block diagram of the control device utilized in the control system of FIG. 1, FIG. 3 is one embodiment of the present flow blending control system, and FIG. 4 is a block diagram of the signal generator utilized in the control system of FIG. 3.

The aim of the present invention will be illustrated after an explanation is first given of the conventional flow blending control system. FIG. 1 shows a conventional blending control system applied to a process for blending two components A and B to produce product C. $Q_1$ and $Q_2$ are the flow of components A and B respectively; 1 is the first flow signal generator which detects flow $Q_1$ and generates a proportional pulse signal; 2 is the second flow signal generator which detects flow $Q_2$ and generates a proportional pulse signal; and 3 is a control device for providing a signal to control valve 4 so as to control the flow of component B at a predetermined ratio $K_2'$ to the flow of component A. Said ratio $K_2'$ can be calculated as:

$$K_2' = \frac{Q_2}{Q_1}$$

Therefore when blending is performed in such manner at a fixed ratio, it is impossible to directly control the ratio $K_1$ of flow $Q_1$ to the blended total $Q_1+Q_2$, and the ratio $K_2$ of flow $Q_2$ to the blended total $Q_1+Q_2$. Therefore, ratio $K_2'$ must be calculated by the conversion:

$$K_2' = \frac{K_2}{1-K_2}$$

In case of the number of components being more than two, the conventional system has a disadvantage in that the calculation of this ratio becomes complex. Accordingly, it would be convenient to be able to determine $K_2'$ directly from $K_1$ and $K_2$.

The aim of the present invention is to provide a blending control system for setting the ratio of control device 3 directly from the ratio $K_1$, $K_2$, etc., of each component blended, to the total flow. Control device 3 of FIG. 1 is illustrated in detail in FIG. 2. 32 is a ratio setting circuit for multiplying pulse signal 11 which is proportional to flow $Q_1$ by the ratio $K_2'$ through which flow $Q_2$ is controlled. 33 is a reversible counter which receives as its input the output of ratio setting circuit 32 and the pulse signal of flow signal generator 2 and which accumulates the total difference between the number of pulses of these two input signals. 34 is a digital-analogue converter and 35 is a controller. Signal 11 in FIGS. 1 and 2 is called the master pulse and corresponds to the index of ordinary measuring instruments.

The blending control system of the present invention will now be explained with reference to the embodiment, a flow blending control system for two components, shown in FIG. 3. It will be noted that the system in FIG. 3 is obtained by adding signal generator 5 to the system in FIG. 1. Signal generator 5 receives the pulse signal from flow generator 1 and produces pulse output signal 51 which is proportional to the blended total $Q_1+Q_2$. In this embodiment of the invention, it is noted that pulse output signal 51 of signal generator 5 acts as the master-pulse.

FIG. 4 is a block-diagram of signal generator 5, in which 52 is an oscillator of the unstable multivibrator type, for example a device described on page 56 of Electronics for October 25, 1963, the oscillating frequency of which varies with the applied voltage and the output signal of which is a pulse signal. 53 is the circuit of a rate multiplier which multiplies the number of input pulses by a fixed ratio, an example of a suitable device is found in FIG. 3 on page 24 of "Automatic Control" for June 1961. 54 is a reversible counter an example of which can be found in FIGS. 4–21 on pages 4–26 of Notes on Analog-Digital Conversion Techniques edited by Alfred K. Susskind; 55 is a digital-analogue converter, 56 is an amplifier, for example a conventional two action operating controller, the output voltage of which increases with an increase in the input signal but which maintains its output voltage even when the input voltage disappears. The signal generator described above is set so that when there is no input pulse signal 11 reversible counter 54 reads zero, the output of digital-analogue converter 55 is zero, and as a result the frequency of oscillator 52 is also zero.

In the present control system as applied by the insertion of signal generator 5 into a conventonal flow blending control system for two components as shown in FIG. 3, when signal pulse 11 from flow signal generator 1 is applied positively to reversible counter 54 of signal generator 5, a deviation voltage appears in the output of digital-analogue converter 55. This is amplified by amplifier 56 and applied to oscillator 52. The frequency of oscillator 52 is raised by the output voltage of amplifier 56. Next, in rate multiplier circuit 53, the pulse output of oscillator 52 is multiplied by the ratio $K_1$ of flow $Q_1$ to the total flow $Q_1+Q_2$. The pulse output of rate multiplier circuit 53 is applied negatively to reversible counter 54. As signal generator 5 operates to make the number of pulses of pulse input 11 equal to the number of output pulses from rate multiplier 53, it will be seen that the number of output pulses from oscillator 52 corresponds to $1/K_1$ $Q_1$ when the two signals are equal. In other words, the number of output pulses from oscillator 52 corresponds to the blended total flow $Q_1+Q_2$. Accordingly, with the present invention, when the pulse output of oscillator 52 is applied as the master signal to control device 3, the desired control of the blending rate can be obtained by merely multiplying the output of oscillator 52 by the ratio $K_2$ of component B to the total flow $Q_1+Q_2$.

As only one signal generator is necessary in the application of the present invention to blending three or more components, it can be seen that the present invention is especially effective when applied to a process for producing a product from a number of components.

As mentioned above, in the flow blending control system of the present invention, a signal generator which detects the flow of any one ingredient among several ingredients and from this signal produces a signal corresponding to the total flow has been added to the conventional flow blending control system. As the master pulse for the control device is the output pulse from the said signal generator, a special feature of the invention is that the ratio of the flow to be controlled to the total flow can be directly employed as the fixed rate. Furthermore, as the complex rate calculation procedure necessary with the conventional blending control system has been eliminated, operation of the system of the present invention becomes extremely simple, and the invention provides a system for the blending of three or more ingredients, which is especially advantageous in industrial application.

I claim:

1. In apparatus for blending at least two fluid components to form a blend thereof wherein the ratio of the flow rate of each of said components to the flow rate of the blend is maintained constant at a desired value, including means to produce a first signal representative of the actual flow rate of a first of said components, means to produce a second signal representative of the actual flow rate of a second of said components, and control means responsive to said signals to control the flow rate of said second component, the improvement comprising first means connected to receive said first signal and adjustable in accordance with the desired value of the ratio of the flow rates of said first component and said blend to produce a third signal representative of the resultant flow rate of said blend, second means connected to receive said third signal and adjustable in accordance with the desired value of the ratio of the flow rates of said second component and said blend to produce a fourth signal representative of the required flow rate of said second component, and third means connected to receive said second and fourth signals and connected to said control means to cause the latter to control the flow rate of said second component to the value at which said second signal is equal to said fourth signal.

2. Apparatus as specified in claim 1, wherein said first means includes a voltage to frequency transducer, a rate multiplier, a reversible counter, a digital to analog converter, and a control amplifier, wherein an output of said transducer is applied to an input of said multiplier, and output of the latter is applied to a first input of said counter, an output of the latter is applied through said converter to an input of said amplifier, and an output of the latter is applied to an input of said transducer, and wherein said first signal is applied to a second input of said counter, said multiplier is adjustable in accordance with said desired value of the ratio of the flow rates of said first component and said blend, and said third signal is produced in said output of said transducer.

References Cited

UNITED STATES PATENTS 3,089,643    5/1963    Idzerda            235—151.34
3,095,887    7/1963    Lupfer              137—98

WILLIAM F. O'DEA, Primary Examiner.

H. M. COHN, Assistant Examiner.

U.S. Cl. X.R.

235—151.34